United States Patent
Hamada et al.

(10) Patent No.: US 7,548,268 B2
(45) Date of Patent: Jun. 16, 2009

(54) SOLID-STATE IMAGE SENSING DEVICE HAVING PHOTORECEPTIVE ELEMENT

(75) Inventors: Minoru Hamada, Ogaki (JP); Yoshihito Higashitsutsumi, Mizuho (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 727 days.

(21) Appl. No.: 10/999,910

(22) Filed: Nov. 30, 2004

(65) Prior Publication Data

US 2005/0128330 A1 Jun. 16, 2005

(30) Foreign Application Priority Data

Dec. 1, 2003 (JP) ............... 2003-401689

(51) Int. Cl.
*H04N 5/232* (2006.01)
(52) U.S. Cl. ...................... 348/349; 348/348
(58) Field of Classification Search ................. 348/312, 348/315, 316, 319, 320, 321, 322, 323, 340, 348/348, 349
See application file for complete search history.

(56) References Cited

U.S. PATENT DOCUMENTS

| | | | |
|---|---|---|---|
| 4,980,735 A | | 12/1990 | Yamawaki |
| 5,308,970 A | * | 5/1994 | Pool ..................... 250/208.1 |
| 5,420,812 A | | 5/1995 | You |
| 5,614,950 A | | 3/1997 | Park et al. |
| 5,694,203 A | * | 12/1997 | Ogawa ..................... 356/5.04 |
| 7,139,028 B2 | * | 11/2006 | Itano et al. .................. 348/340 |
| 2002/0051071 A1 | * | 5/2002 | Itano et al. .................. 348/340 |
| 2004/0252216 A1 | * | 12/2004 | Parks ........................ 348/311 |

FOREIGN PATENT DOCUMENTS

JP 10-20036 1/1998

OTHER PUBLICATIONS

Excerpts from "Basics and Applications of CCD/CMOS Image Sensors," written by Kazuya Yonemoto, 1st edition, published Aug. 10, 2003.
Office Action for Taiwanese Appl. No. 093137003 mailed on Aug. 30, 2005, 3 pages.
English language Translation of Excerpts from Office Action for Taiwanese Appl. No. 093137003, mailed Aug. 30, 2005, 2 pages.
English Patent Abstract of JP10020036 from esp@cenet, published Jan. 23, 1998, 1 page.
Chinese Office Action for Chinese Application No. 200410095087.1, Issued on Jul. 20, 2007 (7 pages).

* cited by examiner

*Primary Examiner*—Sinh N Tran
*Assistant Examiner*—Nicholas G Giles
(74) *Attorney, Agent, or Firm*—Osha • Liang LLP

(57) ABSTRACT

A solid-state image sensing device has a photoreceptive element for storing an information charge generated in response to an incident light and a charge-retaining element for retaining the information charge as it is, adjacently arranged on the surface of a semiconductor substrate, wherein the photoreceptive element and the charge-retaining element can bidirectionally transfer the information charge according to a transfer clock signal.

5 Claims, 12 Drawing Sheets

SOLID-STATE IMAGE SENSING DEVICE HAVING PHOTORECEPTIVE ELEMENT

CROSS-REFERENCE TO RELATED APPLICATION

The entire disclosure of Japanese Application No. 2003-401689 including specification, claims, drawings and abstract is incorporated herein by reference.

BACKGROUND OF THE INVENTION

1. Field of the Invention

The present invention relates to a solid-state image sensing device suitable for a distance-measuring sensor.

2. Description of the Prior Art

FIG. 7 is a view for describing the principle of distance measurement with the use of a distance measuring sensor. The distance measuring sensor comprises a lighting unit 2, a solid-state image sensing device 3 and a processing circuit 4. An object (subject) 1 is irradiated with an irradiating infrared pulse 10 emitted from the lighting unit 2, and a light 12 which is the irradiated infrared pulse 10 reflected by the object 1 is incident on the solid-state image sensing device 3. Then, the solid-state image sensing device 3 stores an information charge in response to the reflected light 12 and sends the information to a processing circuit 4. The processing circuit 4 calculates, on the basis of the information sent from the solid-state image sensing device 3, the phase difference between the irradiating infrared pulse 10 and the reflected light 12, and calculates therefrom the distance between the sensor and the object 1. A specific method for measuring the distance with the distance-measuring sensor will be now described below.

A CCD (a charge coupled device) solid-state image sensing device is a charge transfer element which can transfer information charge as one signal packet at a rate synchronizing with an external clock pulse in one direction in orderly sequence. FIG. 8 is a plan view showing an outline configuration of a frame transfer type of solid-state image sensing device 3. The frame transfer type of solid-state image sensing device 3 has an image sensing portion 3$i$, a storing portion 3$s$, a horizontal transfer portion 3$h$ and an output portion 3$d$. The image sensing portion 3$i$ includes vertical shift registers comprising a plurality of shift registers extended in a vertical direction (a longitudinal direction in FIG. 8) in parallel with each other, and each bit of each shift register is arranged as a matrix of two dimensions. The storing portion 3$s$ also comprises the vertical shift registers comprising the several shift registers extended in the vertical direction (the longitudinal direction in FIG. 8) in parallel with each other. The vertical shift register included in the storing portion 3$s$ is shaded, and each bit of each shift register functions as a storing picture element for storing information charge. A horizontal transfer portion 3$h$ comprises horizontal shift registers arranged so as to extend to a horizontal direction (a transverse direction in FIG. 8). The output of each shift register of the storing portion 3$s$ is connected to each bit of the horizontal shift register. The output portion 3$d$ comprises a capacitor for temporarily storing the information charge transferred from the horizontal shift register in the horizontal transfer portion 3$h$, and a reset transistor for emitting the information charge stored in the capacitor.

FIG. 9A is a schematic plan view showing one part of a conventional image sensing portion 3$i$, and FIG. 9B is a side sectional view along the A-A line thereof. In FIG. 9B, a P well (PW 21) is formed in an N-type semiconductor substrate (an N-sub) 20, and an N well (NW) 22 is formed thereon. Specifically, on the N-type semiconductor substrate 20, a P well (PW 21) doped with a P-type of impurity (dopant) is formed. In the surface region of the P well 21, the N well 22 doped with a high concentration of an N-type dopant is formed.

In addition, in order to separate the channel regions of vertical shift registers, a separation region 25 is installed. By ion-implanting a P-type of dopant in an N well 22 in parallel to each other at predetermined intervals, the separation region 25 comprising a p-type impurity region is formed. The N well 22 is electrically partitioned by the adjacent separation regions 25, and the region sandwiched by the separation regions 25 becomes a channel region which is a transfer path of information charge. The separation regions 25 form potential walls between the adjacent channel regions, and electrically separate each channel region.

On the surface of a semiconductor substrate 20, an insulation film 23 is formed. So as to be perpendicular to the extending direction of a channel region, a plurality of transfer electrodes 24 made of a polysilicon film are arranged in parallel to each other, through the insulation film 23. Furthermore, in order to reduce the resistant component of the transfer electrodes 24, backing wires 26 consisting of a tungsten silicide film are connected through an opening to the predetermined number of the transfer electrodes 24, and are arranged in parallel to the extending direction of the channel regions. A group of five adjacent transfer electrodes 24-1, 24-2, 24-3, 24-4 and 24-5 corresponds to one picture element.

FIG. 10 shows the relationship, in the distance-measuring sensor shown in FIG. 7, during an image sensing period Ts when an irradiating infrared pulse 10 has irradiated an object 1 from a lighting unit 2, among an irradiating infrared pulse 10, the intensity of a reflected light 12, the transfer clock signal of a solid-state image sensing device 3 and the stored charge of the solid-state image sensing device 3. In FIG. 10, a horizontal axis shows the time.

At first, in advance of an image sensing period Ts, the information charge stored in each picture element of a solid-state image sensing device is removed by a method such as an electronic shutter.

Subsequently, as shown in FIG. 10($a$), an irradiating infrared pulse 10 having the brightness modulated into a predetermined frequency consisting of an irradiation period Tp and a non-irradiation period Tp, is emitted from a lighting unit 2 of a distance-measuring sensor toward an object 1 only during an image sensing period Ts. At this time, as shown in FIG. 10($b$), the object 1 reflects a light having a phase difference (a phase delay) in proportion to the distance between the distance-measuring sensor and the object 1, and the reflected light 12 is incident on a solid-state image sensing device 3. When representing the distance between the distance-measuring sensor and the object 1 as r, and the light velocity as c, an optical path length is 2r and one cycle is 2 Tp, so that the phase difference between them is expressed by $2\pi r/c/Tp$ [rad]. Here, as shown in FIG. 10($c$), by using a transfer clock signal, the solid-state image sensing device 3 synchronizes a charge-storing period (an ON period) and a charge non-storing period (an OFF period) to the irradiating infrared pulse 10. When the device is sensing an image, a potential profile in an N well 22 along the channel region (a side cross section along a B-B Line in FIG. 9A) of an image sensing portion 3$i$ is shown in FIGS. 11A and B. In a charge-storing period, the device turns three transfer electrodes 24-2 to 24-4, among a set of transfer electrodes 24 as shown in FIG. 11A, to an ON state to form a potential well 30 in the channel regions under the transfer electrodes 24-2 to 24-4, and turns the remaining transfer electrodes 24-1 and 24-5 to an OFF state. As a result, the potential well 30 under the transfer electrodes 24-2 to 24-4 in the ON state stores an information charge corresponding to the intensity of a reflected light 12. At this time, as shown in FIG. 10(d), in the period when the charge-storing period overlaps with the high intensity period of the reflected light, an ON-time charge is stored. In the charge non-storing period, as shown in FIG. 11B, the image sensing device turns one transfer electrode 24-3 among a set of the transfer electrodes 24 to the ON state, to form a potential well 31 in the channel region under the transfer electrode 24-3, and turns the remaining transfer electrodes 24-1, 24-2, 24-4 and 24-5 to the OFF state. As a result, the potential well 31 under the transfer electrode 24-3 in the ON state retains the information charge by that time. However, during the charge non-storing period as well, the OFF-time charge is stored in the period when the charge non-storing period overlaps with the high intensity period of the reflected light, as shown in FIG. 10(d). This is because, as is clear in FIG. 11B, in the charge non-storing period as well, the reflected light 12 is incident on the transfer electrode 24-3 and generates a new information charge. Because the ON-time charge and the OFF-time charge, generated in one cycle, are extremely low, the charge-storing period and the non-charge-storing period are repeated only during the imaging period Ts, and then each picture element cumulatively stores the ON-time charge and the OFF-time charge therein in every one cycle as the information charge.

After the lapse of an image sensing period Ts, an image sensing device transfers information charge stored in each picture element by that time, to a storing portion 3s from an image sensing portion 3i. When the information charge is transferred, as shown in a transferring period Tt in FIG. 12, five-phases of transfer clock signals $\phi 1$ to $\phi 5$ are applied to every combined unit consisting of five adjacent transfer electrodes 24-1, 24-2, 24-3, 24-4 and 24-5, the potentials of channel regions under the transfer electrodes 24-1, 24-2, 24-3, 24-4 and 24-5 are controlled, and the information charges are transferred to one direction.

As described above, an information charge stored in the picture element of a solid-state image sensing device 3 when the solid-state image sensing device 3 makes an irradiating infrared pulse 10 irradiate an object 1 only during an image sensing period Ts, and sets a charge-storing period so as to synchronize with the irradiating infrared pulse 10, is defined as Qp. On the other hand, the information charge stored in the picture element of the solid-state image sensing device 3 when the solid-state image sensing device 3 makes the irradiating infrared pulse 10 continuously irradiate the object 1 only during the image sensing period Ts, and sets the whole image sensing period Ts as a charge-storing period of each picture element, is defined as Qs. Then, because the quantity of the generated information charge per unit time is proportional to a photoreceptive area, an OFF-time charge becomes one-third of an ON-time charge. Consequently, the ratio of the information charge Qp to the information charge Qs is described below according to FIG. 10(d).

$$Qp/Qs = \{(Tp-2r/c)+(2r/c)\cdot(1/3)\}/2Tp \quad (1)$$

If the expression (1) is rewritten, the distance r between a distance-measuring sensor and an object 1 is expressed by the following expression.

$$r = 3Tp\cdot c(1-2Qp/Qs)/4 \quad (2)$$

As described above, the distance r between a distance-measuring sensor and an object 1 is calculated from the expression (2). Practically, information charges Qp and Qs cannot be directly measured, so that the distance r is calculated from the ratio of a picture signal output from an output portion in correspondence with the information charge Qp obtained when the irradiating infrared ray is applied in a pulse form, and the information charge Qs obtained when continuously applied.

As described above, the distance r between a distance-measuring sensor and an object 1 is calculated from the expression (2). However, besides the fact that an ON-time charge per unit cycle is extremely small, this method generates a not small OFF-time charge in a charge non-storing period as well, consequently makes the difference of sensitivity between a charge storing period and the charge non-storing period small in a solid-state image sensing device 3, and causes a problem that an error in calculating the distance r increases. Here, though the distance r is calculated from the ratio of information charge Qp during pulse irradiation to information charge Qs during continuous irradiation, the rate of change (a differential coefficient) of the ratio by the distance r is $-2/(3Tp\cdot c)$.

SUMMARY OF THE INVENTION

A solid-state image sensing device according to the present invention has a photoreceptive element for storing the information charge generated in response to an incident light and a charge-retaining element for retaining the information charge as it is, adjacently arranged on the surface of a semiconductor substrate, wherein the photoreceptive element and the charge-retaining element can bidirectionally transfer the information charge according to a transfer clock signal.

BRIEF DESCRIPTION OF THE DRAWING(S)

DESCRIPTION OF THE PREFERRED EMBODIMENTS

Preferred embodiments (hereafter referred to as embodiments) according to the present invention will be now described below with reference to drawings.

EXAMPLES

Embodiment 1

Figure 1A:
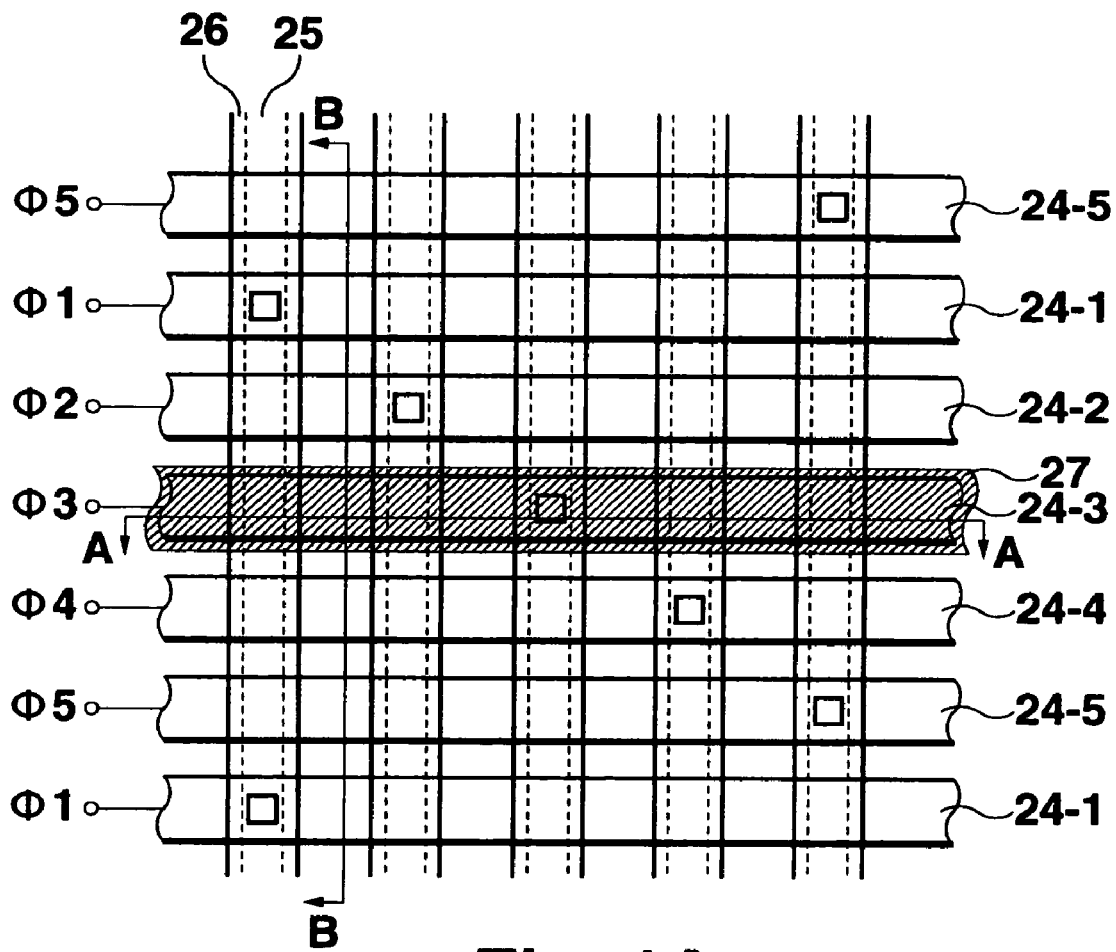
FIG. 1A is a schematic plan view showing a part of an image sensing portion of a frame transfer type CCD solid-state image sensing device of the embodiment 1 according to the present invention.
Figure 1B:
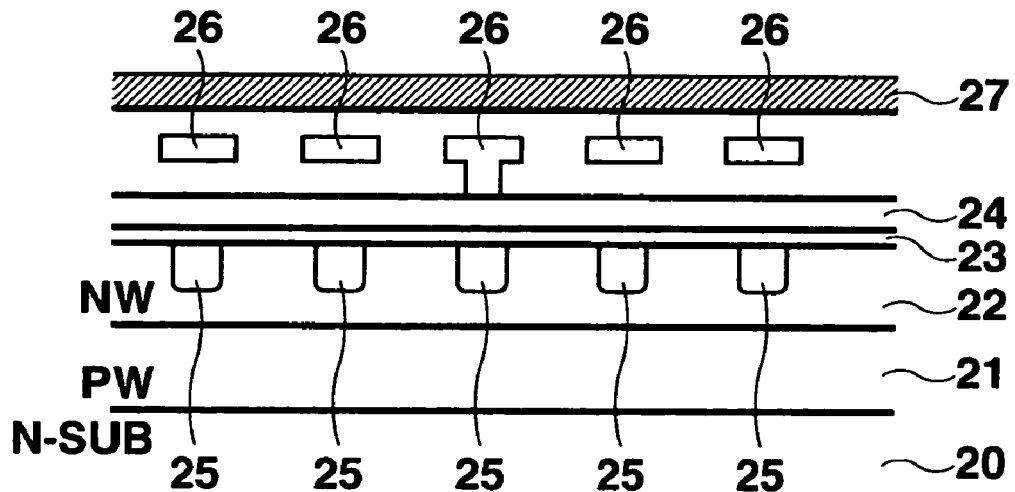
FIG. 1B is a schematic side sectional view showing one part of an image sensing portion of a frame transfer type CCD solid-state image sensing device of the embodiment 1 according to the present invention.

FIG. 1A is a schematic plan view showing a part of an image sensing portion of a frame transfer type CCD solid-state image sensing device of the embodiment 1 according to the present invention, and FIG. 1B is a schematic side sectional view along the A-A line thereof. In addition, FIG. 2 shows a potential profile in an N well 22 along a channel region (in a side cross section along the B-B line in FIG. 1A) of an image sensing portion. In the present embodiment, the same component as a conventional frame transfer type solid-state image sensing device 3 according to FIGS. 9A, 9B, 11A and 11B is marked with the same sign.

Figure 3:
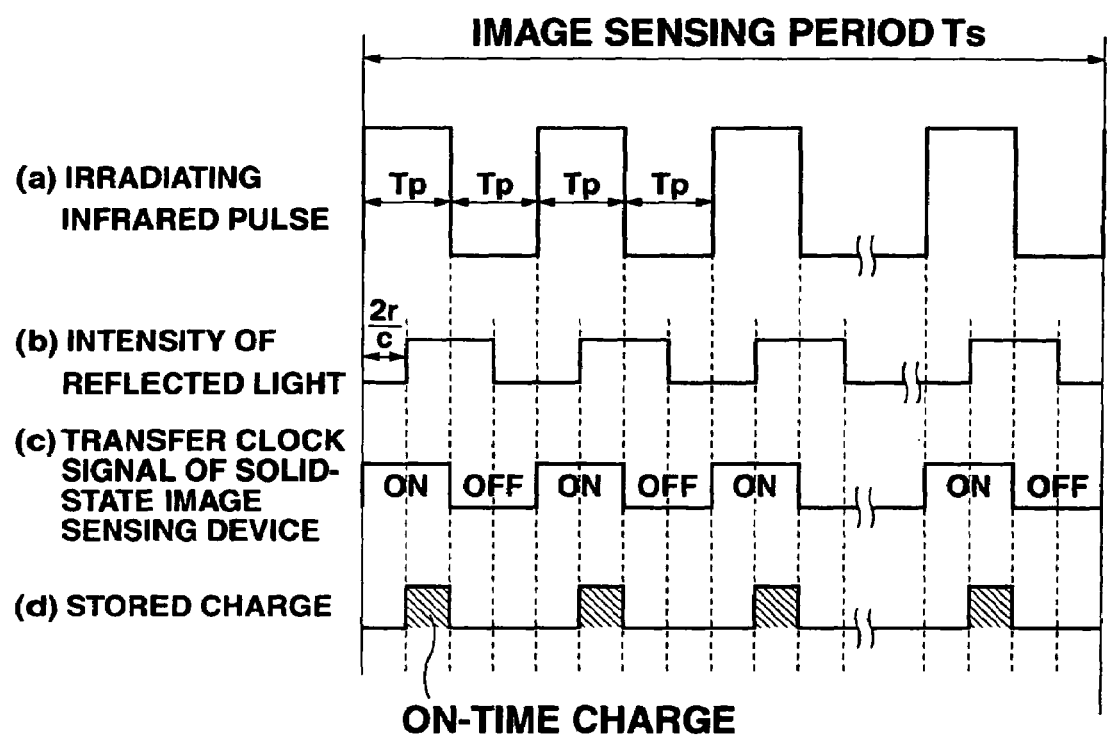
FIG. 3 is a view showing a relationship among an irradiating infrared pulse, the intensity of a reflected light, the transfer clock signal of a solid-state image sensing device and a stored charge in a solid-state image sensing device, during an image sensing period according to the present invention.

In the present embodiment, the top of a transfer electrode 24-3 for forming a potential well 31 in a charge non-storing period is covered with a shading film 27. Accordingly, as shown in FIG. 3(a), the solid-state image sensing device according to the present embodiment measures the distance r between an object 1 and the device itself by irradiating the object 1 with an irradiating infrared pulse 10 emitted from a lighting unit 2, as described below.

At first, in advance of an image sensing period Ts, the information charge stored in each picture element of a solid-state image sensing device is removed by a method such as an electronic shutter.

Figure 2A:
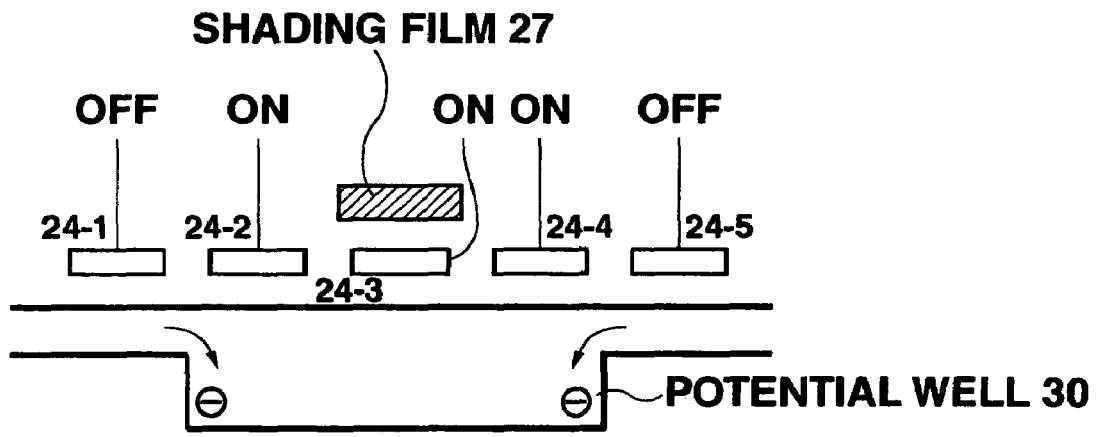
FIGS. 2A and 2B are views showing a state of a potential profile of the embodiment 1 according to the present invention.
Figure 2B:
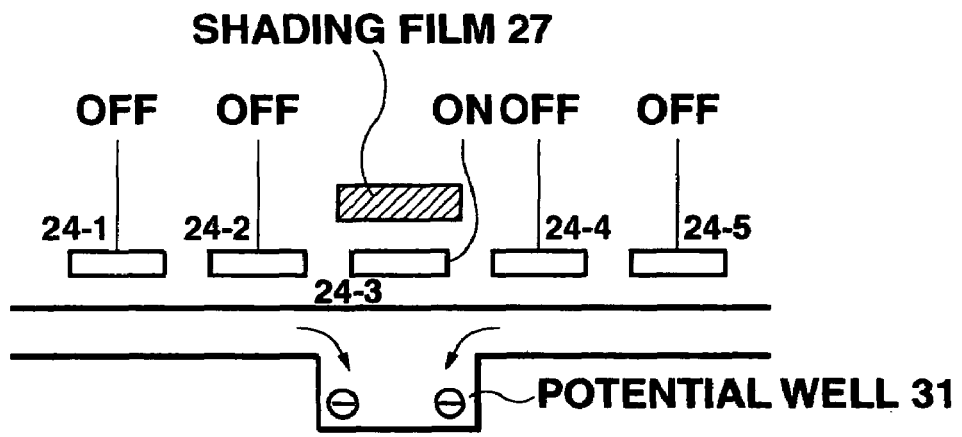

Then, during a charge storing period in an image sensing period Ts, the device turns three transfer electrodes 24-2 to 24-4 among a set of transfer electrodes 24 as shown in FIG. 2A to an ON state, forms a potential well 30 in a channel region under the transfer electrodes 24-2 to 24-4, and turns the remaining transfer electrodes 24-1 and 24-5 to an OFF state. As a result, the potential well 30 under the transfer electrodes 24-2 to 24-4 stores the information charge generated during the ON state. At this time, as shown in FIG. 3(d), in the period when the charge-storing period overlaps with the high intensity period of the reflected light, an ON-time charge is stored. On the other hand, during the charge non-storing period in the image sensing period Ts, as shown in FIG. 2B, the image sensing device turns one transfer electrode 24-3 among a set of the transfer electrodes 24 to the ON state, forms a potential well 31 in the channel region under the transfer electrode 24-3, and turns the remaining transfer electrodes 24-1, 24-2, 24-4 and 24-5 to the OFF state. As a result, the potential well 31 under the transfer electrode 24-3 in the ON state retains the information charge. In this case, because the transfer electrode 24-3 is covered with a shading film 27 in the charge non-storing period, the information charge is not generated by a reflected light 12, so that a new information charge is not stored as shown in FIG. 3(d). Thus, the transfer electrodes 24-2 and 24-4 for generating and storing the information charge in response to the reflected light 12 during only the charge-storing period and the part forming the potential well under the transfer electrodes become a photoreceptive element, and the transfer electrode 24-3 for retaining the information charge stored in the photoreceptive element during the charge non-storing period just as it is and the part forming the potential well under the transfer electrode become a charge-retaining element.

In this period, only an ON-time charge is generated in one cycle, and while a charge-storing period and a charge non-storing period are repeated, the ON-time charge is cumulatively stored in each picture element as information charge, in every one cycle. After the lapse of an image sensing period Ts, similarly to a conventional method, the information charge stored in each picture element by that time is transferred to a storing portion from an image sensing portion.

Figure 10:
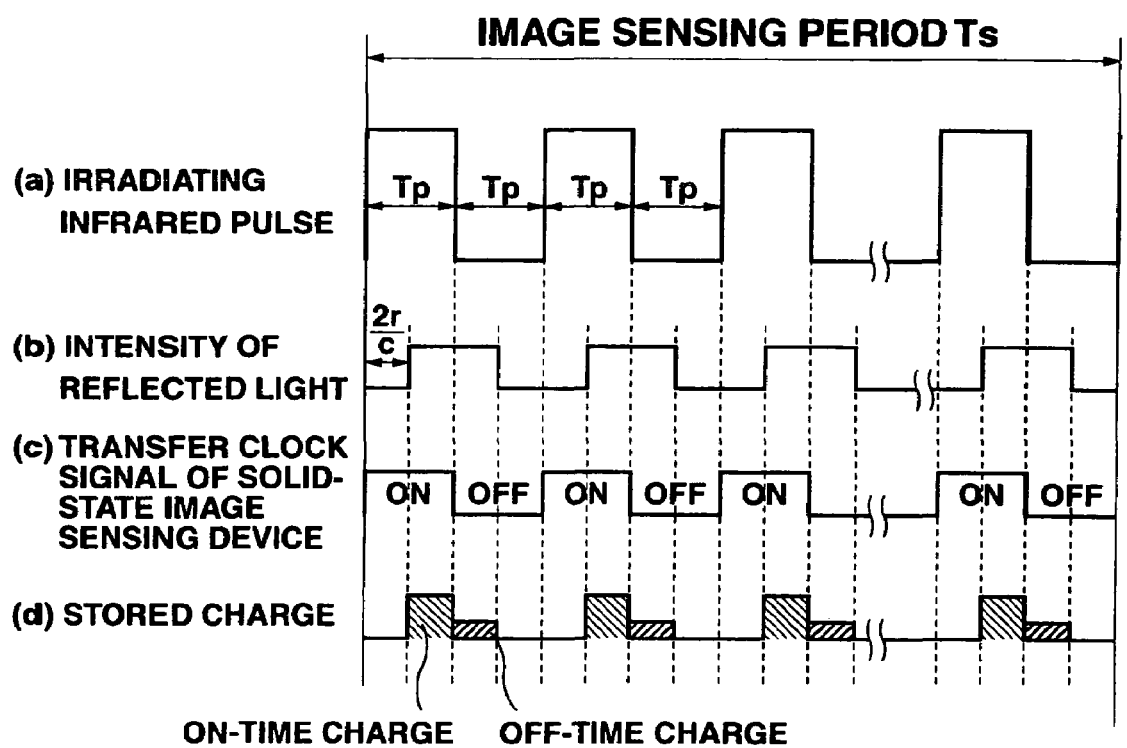
FIG. 10 is a view showing a relationship among an irradiating infrared pulse, the intensity of a reflected light, the transfer clock signal of a solid-state image sensing device and a stored charge in a solid-state image sensing device, during an image sensing period, in the Related Art.
Figure 11A:
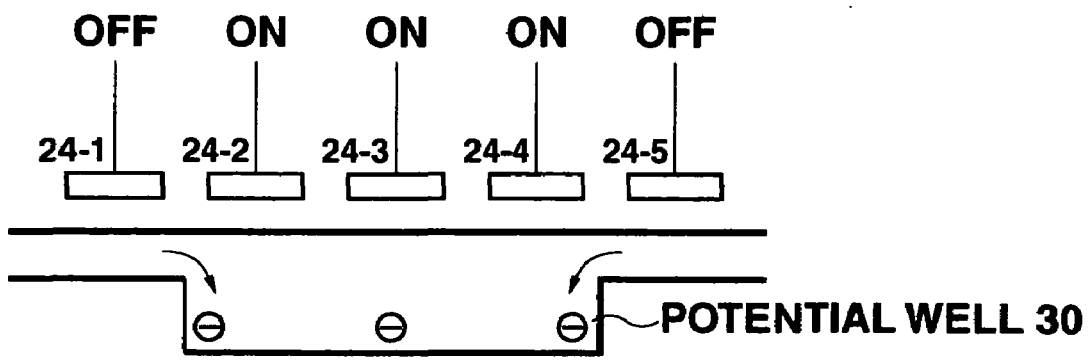
FIGS. 11A and 11B are views showing the state of a potential profile of a solid-state image sensing device in the Related Art.
Figure 11B:
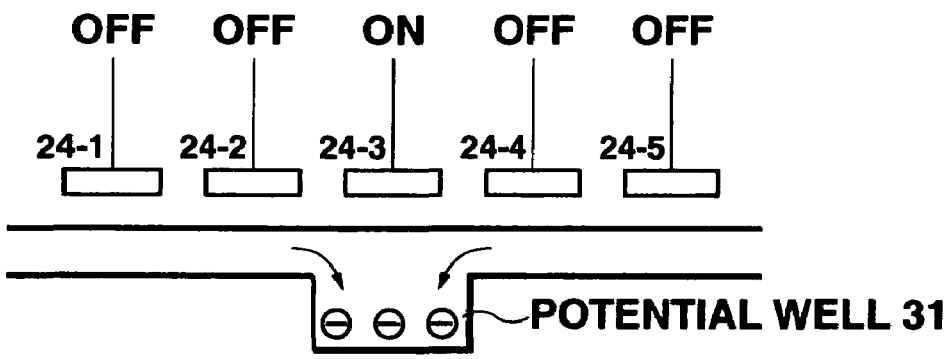
Figure 12:
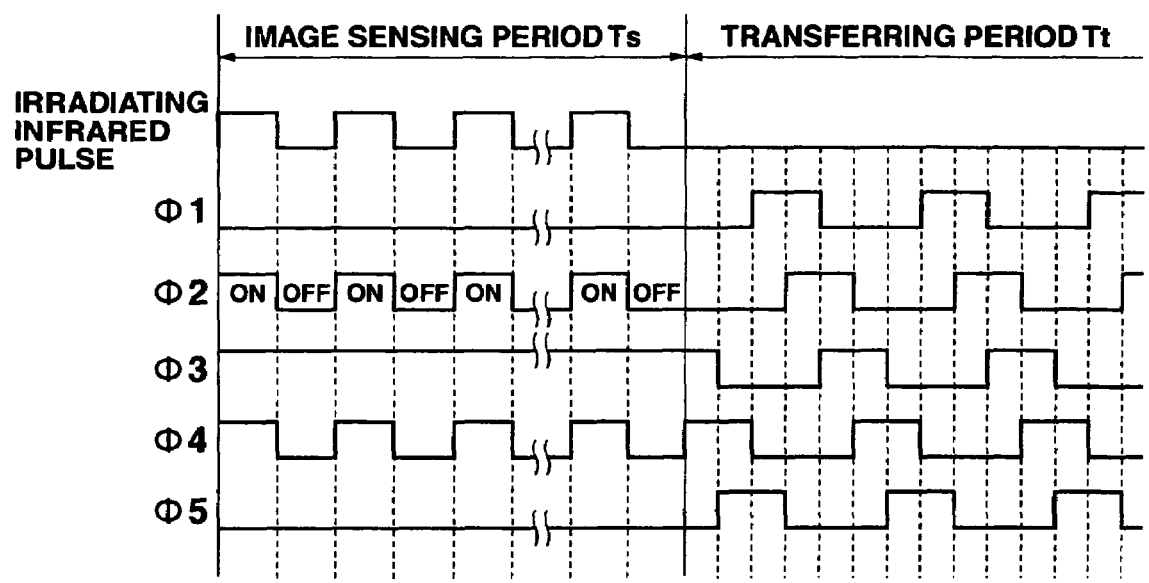
FIG. 12 is a view showing transfer clock signals applied to transfer electrodes during an image sensing period and a transfer period of a solid-state image sensing device.

As described above, an information charge stored in a picture element of a solid-state image sensing device when the solid-state image sensing device according to the present embodiment makes an irradiating infrared pulse 10 irradiate an object 1 only during an image sensing period Ts, and sets a charge-storing period so as to synchronize with the irradiating infrared pulse 10, is defined as Qp. On the other hand, the information charge stored in the picture element of the solid-state image sensing device when the solid-state image sensing device makes the irradiating infrared pulse 10 continuously irradiate the object 1 only during the image sensing period Ts, and sets the whole image sensing period Ts as a charge-storing period of each picture element, is defined as Qs. In addition, because the quantity of the generated information charge per unit time is proportional to a photoreceptive area, an ON-time charge is two-thirds of the case in the prior art of FIG. 11, and an OFF-time charge is not generated. Consequently, the ratio of the information charge Qp to the information charge Qs is described below according to FIG. 10(d).

$$Qp/Qs = \{(Tp - 2r/c) \cdot (2/3)\} / \{2Tp \cdot (2/3)\} \quad (3)$$

If the expression (3) is rewritten, the distance r between a distance-measuring sensor and an object 1 is expressed by the following expression.

$$r = Tp \cdot c \, (1 - 2Qp/Qs)/2 \quad (4)$$

As described above, the distance r between a distance-measuring sensor and an object 1 is calculated from the expression (4). In this method, only an ON-time charge is stored as information charge in every one cycle, and an OFF-time charge is not generated, so that a solid-state image sensing device has a large difference in sensitivity between a charge-storing period and a charge non-storing period, and makes an error in calculating the distance r small. Specifically, though the distance r is calculated from the ratio of the information charge Qp during pulse irradiation to the information charge Qs during continuous irradiation, the rate of change (a differential coefficient) of the ratio by the distance r is $-1/(Tp \cdot c)$. In this method, when the distance r varies, Qp/Qs varies by 3/2 times larger than the case of the prior art shown in FIGS. 11A and B, so that the sensitivity (the resolution) can be increased in measuring the distance r.

Embodiment 2

Figure 4A:
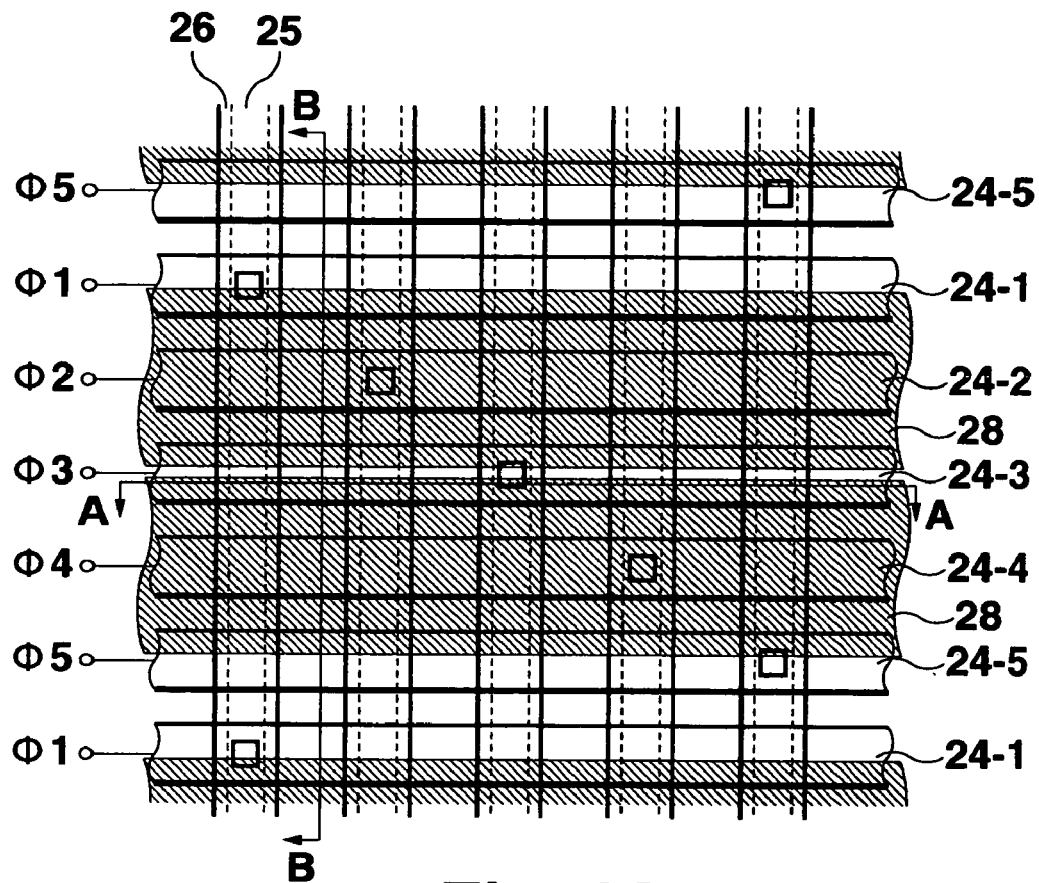
FIG. 4A is a schematic plan view showing one part of an image sensing portion of a frame transfer type CCD solid-state image sensing device of the embodiment 2 according to the present invention.
Figure 4B:
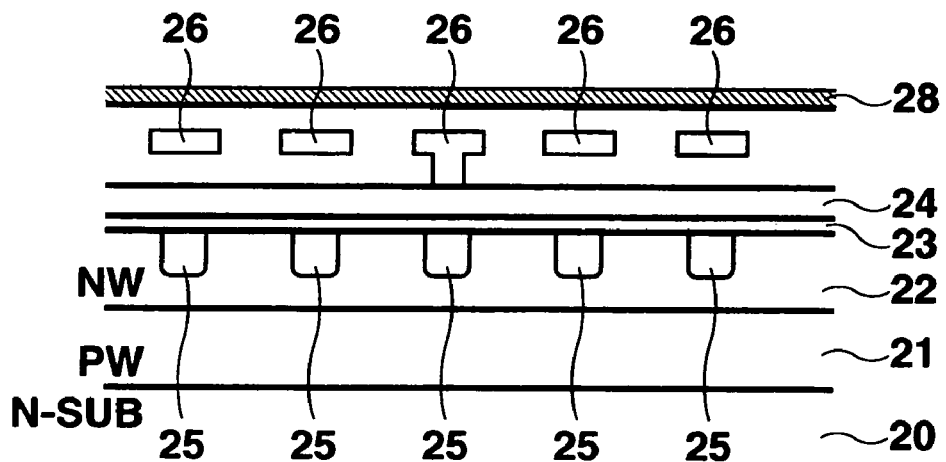
FIG. 4B is a schematic side sectional view showing a part of an image sensing portion of a frame transfer type CCD solid-state image sensing device of the embodiment 2 according to the present invention.
Figure 5A:
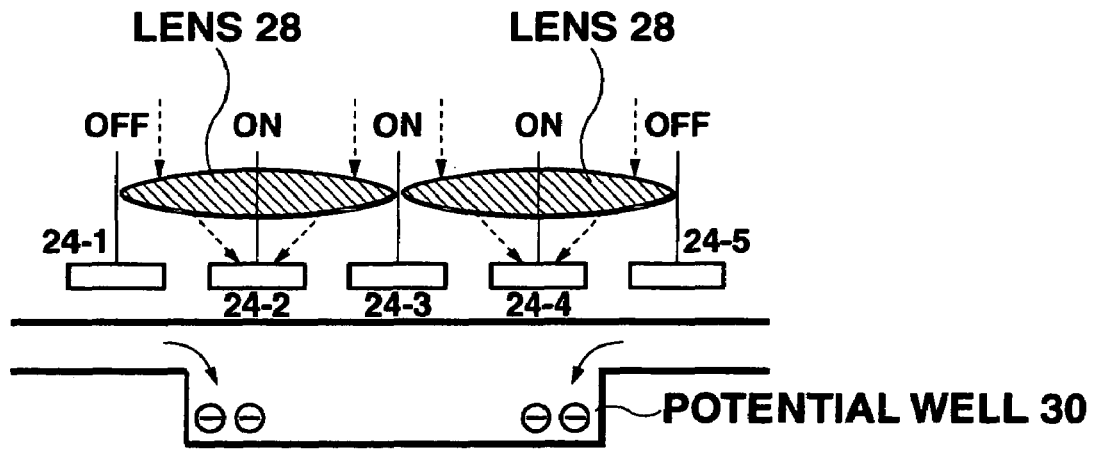
FIGS. 5A and 5B are views showing a state of a potential profile in the embodiment 2 according to the present invention.
Figure 5B:
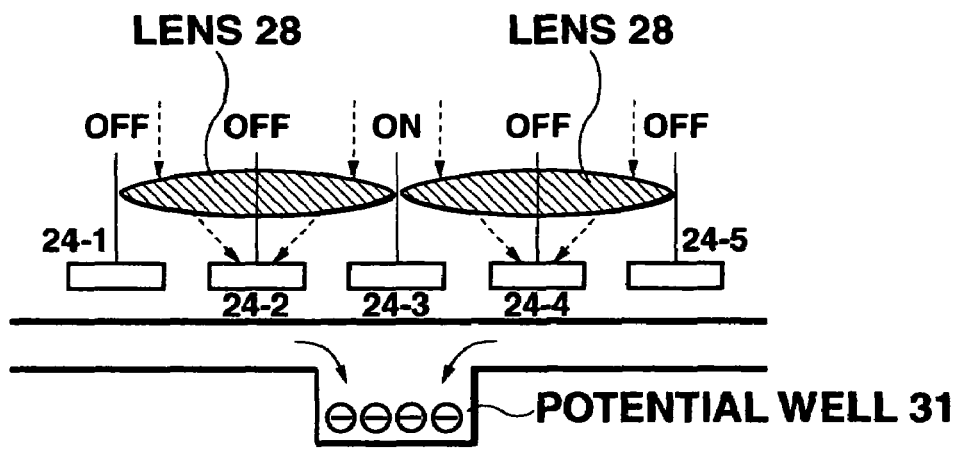

FIG. 4A is a schematic plan view showing a part of the image sensing portion of the frame transfer type CCD solid-state image sensing. device of the embodiment 2 according to the present invention, and FIG. 4B is a schematic side sectional view along the A-A line thereof. In addition, FIGS. 5A and 5B show the state of a potential profile in an N well 22 along a channel region (a side cross section along the B-B line of FIG. 4A) of an image sensing portion. In the present embodiment as well, the same component as the conventional frame transfer type solid-state image sensing device according to FIGS. 9A, 9B, 11A and 11B is marked with the same sign.

In the present embodiment, a part above a transfer electrode 24 is covered with a lens 28. By the action of the lenses 28, the reflected lights 12 are refracted and gathered into the transfer electrodes 24-2 and 24-4, but are not gathered into a transfer electrode 24-3. Consequently, the measurement method for the distance r between a distance-measuring sensor and an object 1 by irradiating the object 1 with an irradiating infrared pulse 10 from a lighting unit 2 as shown in FIG. 3(a), and by using a solid-state image sensing device according to the present embodiment, is as described below.

At first, in advance of an image sensing period Ts, the information charge stored in each picture element of a solid-state image sensing device is removed by means of an electronic shutter or the like.

Then, during a charge-storing period in an image sensing period Ts, the device turns three transfer electrodes 24-2 to 24-4 among a set of transfer electrodes 24 as shown in FIG. 5A to an ON state, forms a potential well 30 in a channel region under the transfer electrodes 24-2 to 24-4, and turns the remaining transfer electrodes 24-1 and 24-5 to an OFF state. As a result, the potential well 30 under the transfer electrodes 24-2 to 24-4 stores the information charge generated during the ON state. At this time, as shown in FIG. 3(d), in the period when a charge-storing period overlaps with the high intensity period of the reflected light, an ON-time charge is stored. On the other hand, during a charge non-storing period in the image sensing period Ts, as shown in FIG. 5B, the image sensing device turns one transfer electrode 24-3 among a set of the transfer electrodes 24 to the ON state, forms a potential well 31 in a channel region under the transfer electrode 24-3, and turns the remaining transfer electrodes 24-1, 24-2, 24-4 and 24-5 to the OFF state. As a result, the potential well 31 under the transfer electrode 24-3 in the ON state retains the information charge. At this time, in the charge non-storing period, the transfer electrode 24-3 receives only the slightly reflected light 12 having passed through the clearance between adjacent lenses 28 because other lights are refracted by the action of the lenses, and generates no information charge there, so that a new information charge as shown in FIG. 3(d) is not stored. Thus, the transfer electrodes 24-2 and 24-4 for generating and storing the information charge in response to the reflected light 12 only during the charge-storing period and the part of forming the potential well under the transfer electrodes become a photoreceptive element, and the transfer electrode 24-3 for retaining the information charge stored in the photoreceptive element during the charge non-storing period just as it is and the part of forming the potential well under the transfer electrode become a charge-retaining element.

In this case, only an ON-time charge is generated in one cycle, and while a charge-storing period and a charge non-storing period are repeated, an ON-time charge is cumulatively stored in each picture element as information charge, in every one cycle. After the lapse of an image sensing period Ts, similarly to a conventional method, the information charge stored in each picture element by that time is transferred to a storing portion from an image sensing portion.

As described above, an information charge stored in a picture element when the solid-state image sensing device according to the present embodiment makes an irradiating infrared pulse 10 irradiate an object 1 only during an image sensing period Ts, and sets a charge-storing period so as to synchronize with the irradiating infrared pulse 10, is defined as Qp. On the other hand, the information charge stored in the picture element of the solid-state image sensing device when the solid-state image sensing device makes the irradiating infrared pulse 10 continuously irradiate the object 1 only during the image sensing period Ts, and sets the whole image sensing period Ts as the charge-storing period of each picture element, is defined as Qs. In addition, because the quantity of a generated information charge per unit time is proportional to a photoreceptive area, an ON-time charge is four-thirds of the case in the prior art of FIGS. 11A and 11B, and few OFF-time charges are generated because a reflected light 12 passes slightly through the clearance between adjacent lenses 28. Consequently, the ratio of the information charge Qp to the information charge Qs is described below according to FIG. 3(d).

$$Qp/Qs = \{(Tp - 2r/c) \cdot (4/3)\} / \{2Tp \cdot (4/3)\} \quad (5)$$

If the expression is transformed, the distance r between a distance-measuring sensor and an object 1 is described below.

$$r = Tp \cdot c (1 - 2Qp/Qs)/2 \quad (6)$$

As described above, the distance r between a distance-measuring sensor and an object 1 is calculated from the expression (6). Because the expression (6) is same as the expression (4), in the embodiment 2 as in the case of the embodiment 1, a solid-state image sensing device has a great difference in sensitivity between a charge-storing period and a charge non-storing period, and can make an error in calculating the distance r small. In the embodiment 2, an ON-time charge generated in one cycle is larger than in the embodiment 1, so that even if the number of repetitions of the charge-storing period and the charge non-storing period is reduced, the same quantity of information charge can be stored. Specifically, because an image sensing period Ts can be shortened, the duration of time for measuring the distance r with the use of the distance-measuring sensor can be reduced, and simultaneously the power consumption can be reduced.

Embodiment 3

Figure 6A:
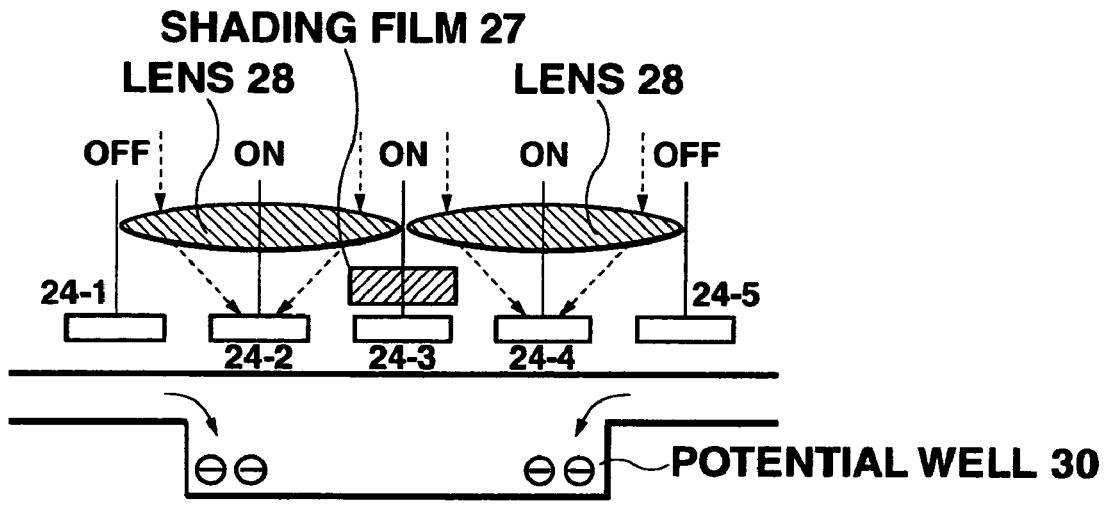
FIGS. 6A and 6B are views showing a state of a potential profile in the embodiment 3 according to the present invention.
Figure 6B:
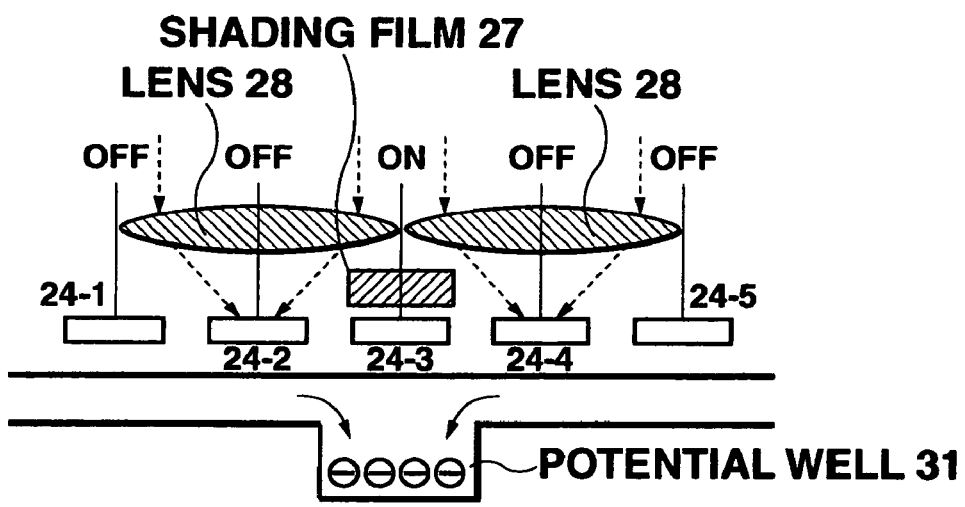
Figure 7:
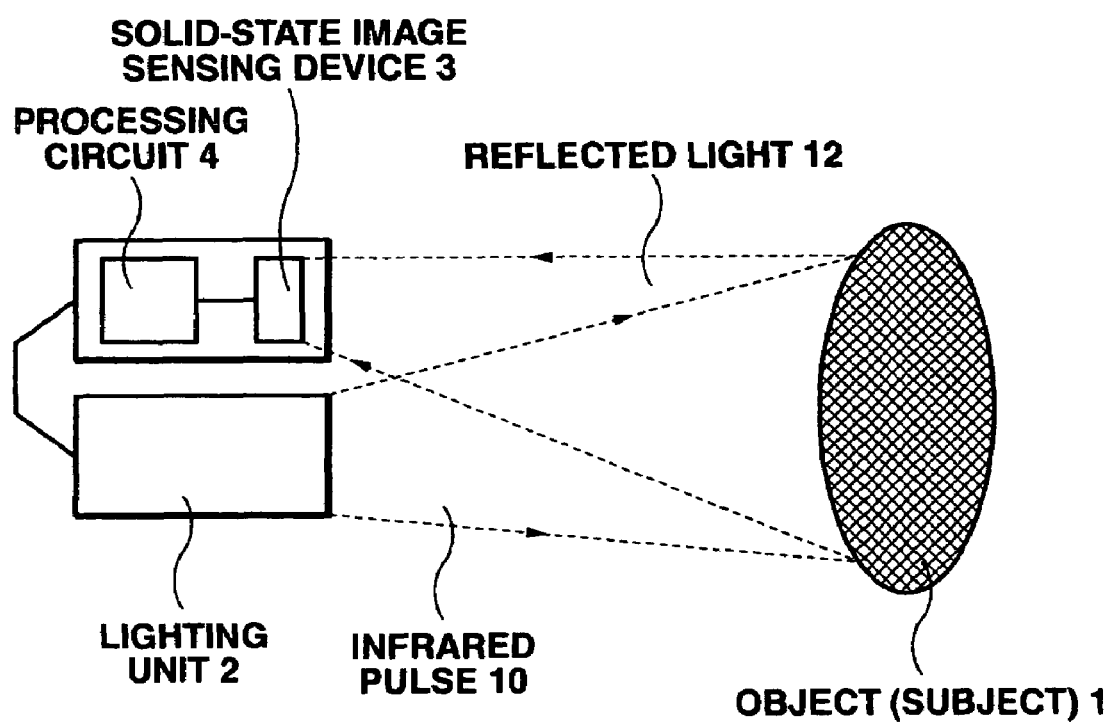
FIG. 7 is a schematic diagram for describing the principle of distance measurement with the use of a distance-measuring sensor.
Figure 8:
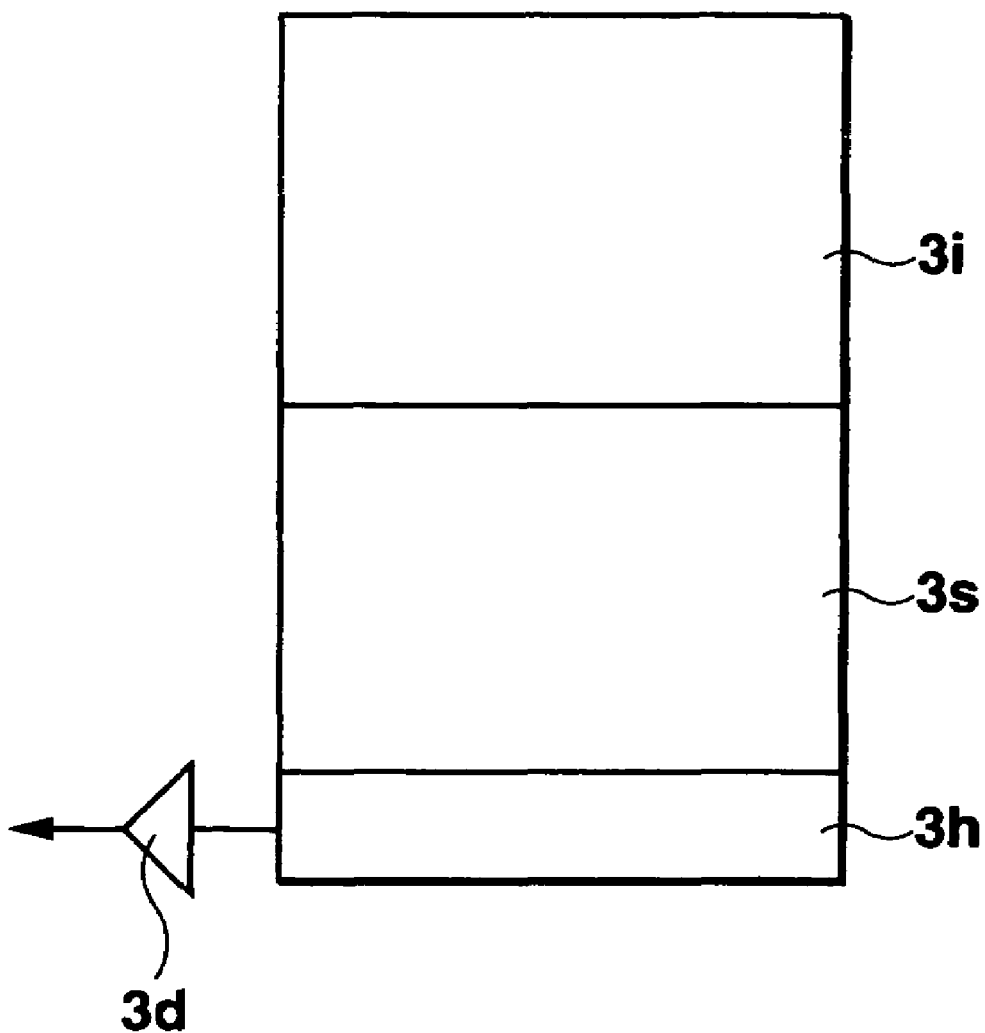
FIG. 8 is a plan view showing an outline configuration of a frame transfer type of a solid-state image sensing device.
Figure 9A:
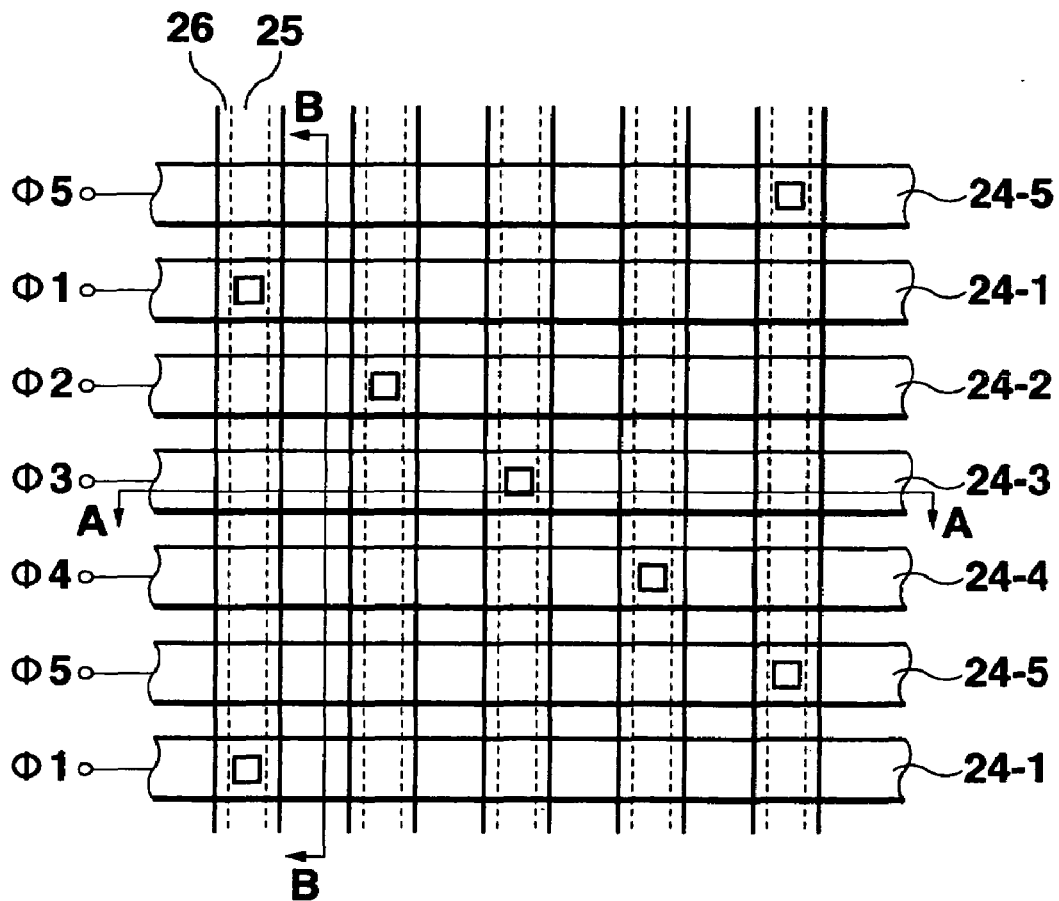
FIG. 9A is a schematic plan view showing one part of the image sensing portion of a solid-state image sensing device in the Related Art.
Figure 9B:
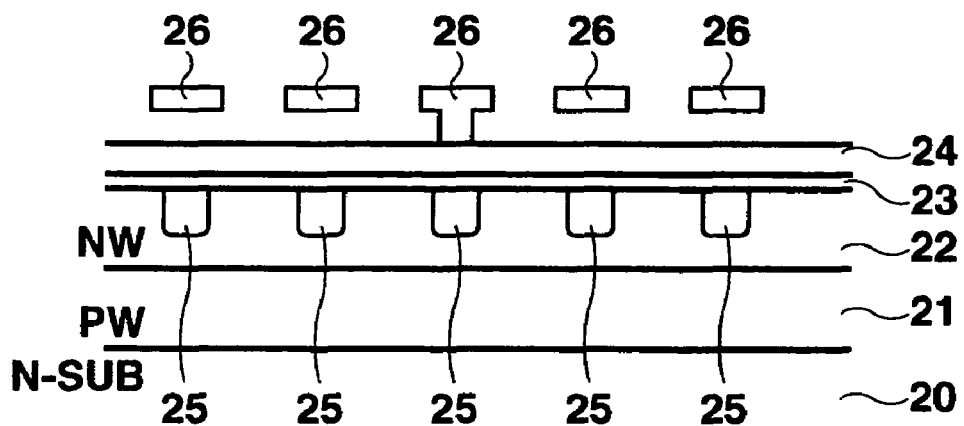
FIG. 9B is a schematic side sectional view showing one part of the image sensing portion of a solid-state image sensing device in the Related Art.

The image sensing portion of the frame transfer type CCD solid-state image sensing device of the embodiment 3 according to the present invention combines that in both the embodiment 1 and the embodiment 2. FIGS. 6A and 6B show the state of a potential profile in an N well 22 along the channel region of the image sensing portion. In the present embodiment as well, the same component as the conventional frame transfer type solid-state image sensing device according to FIGS. 9A, 9B, 11A and 11B is marked with the same sign.

In the present embodiment, the top of a transfer electrode 24-3 is covered with a shading film 27. The part further above the shading film 27 on the transfer electrode 24-3 is covered with a lens 28. By the action of the lens 28, a reflected light 12 is refracted and gathered into transfer electrodes 24-2 and 24-4, but is not gathered into the transfer electrode 24-3. In addition, on the transfer electrode 24-3, even a slight reflected light 12 having passed through the clearance between the adjacent lenses 28 is intercepted by the shading film 27. Accordingly, in the embodiment 2, a slight OFF-time charge is generated in the charge non-storing period, but in the present embodiment, no OFF-time charge is generated.

In embodiment 3 as well as in embodiments 1 and 2, a solid-state image sensing device has a great difference in sensitivity between a charge-storing period and a charge non-storing period, and can make an error in calculating the distance r small. In addition, in the present embodiment similarly to embodiment 2, an ON-time charge generated in one cycle is greater than in embodiment 1, so that even if the number of the repetitions of the charge-storing period and the charge non-storing period is reduced, the same quantity of the information charge can be stored. Specifically, because an image sensing period Ts can be shortened, the duration of time for measuring the distance r with the use of a distance-measuring sensor can be reduced, and simultaneously the power consumption can be reduced.

In the solid-state image sensing device of each embodiment described above, pairs of a photoreceptive element and a charge-retaining element are arranged into a matrix form. As a result, each picture element calculates the distance r between the element and an object 1, and consequently the device can three-dimensionally grasp the unevenness of the surface of the object 1.

In addition, the preferred embodiments are described referring to a frame transfer type CCD solid-state image sensing device, but are not limited to it. Specifically, a solid-state image sensing device according to the present invention has only to have such a photoreceptive element for storing the information charge generated in response to an incident light and such a charge-retaining element for retaining the information charge as it is, adjacently arranged on the surface of a semiconductor substrate, to be able to mutually and bidirectionally transfer the information charge according to a transfer clock signal.

What is claimed is:

1. A solid-state image sensing device having an unshielded photoreceptive element for storing an information charge generated in response to an incident light and a light-shielded charge-retaining element for retaining the information charge as it is, adjacently arranged on the surface of a semiconductor substrate, wherein the information charge can be bidirectionally transferred between the photoreceptive element and the charge-retaining element by a transfer clock signal, and wherein the solid-state image sensing device is used for a distance-measuring sensor for calculating the distance between the distance-measuring sensor and an object, by irradiating the object with an irradiating light having the brightness modulated into a predetermined frequency for a predetermined period, simultaneously image-sensing the object by repeating a state in which a potential is formed to store charges in the photoreceptive element and the charge-retaining element and a state in which a potential is formed to store charges in only the charge-retaining element while synchronizing the transfer clock signal with the irradiating light having the modulated brightness, and detecting a phase difference between the irradiating light and the reflected light from the object.

2. The solid-state image sensing device according to claim 1, wherein the solid-state image sensing device is a frame transfer type, and
the charge-retaining element has a structure having a shading film formed on the photoreceptive element.

3. The solid-state image sensing device according to claim 1, wherein the solid-state image sensing device is a frame transfer type, and
the charge-retaining element has a structure having a lens above the photoreceptive element so as to make a light incident on the charge-retaining element not be gathered into the charge-retaining element.

4. The solid-state image sensing device according to claim 1, wherein the solid-state image sensing device is a frame transfer type, and
the charge-retaining element has a structure having a shading film formed on the photoreceptive element, and having a lens further above the shading film on the photoreceptive element, so as to make a light incident on the charge-retaining element not be gathered into the charge-retaining element.

5. The solid-state image sensing device according to claim 1, wherein pairs of the photoreceptive element and the charge-retaining element are arranged into a matrix form.

* * * * *